United States Patent
Freedman et al.

[15] 3,652,127
[45] Mar. 28, 1972

[54] COUNTERBALANCED FOLDING SEATS WITH POSITION LOCK

[72] Inventors: Paul Freedman; Gerald Freedman; Robert A. Wahls; Harvey R. Hornstein, all of Evanston, Ill.

[73] Assignee: Freedman Seating Company, Evanston, Ill.

[22] Filed: May 18, 1970

[21] Appl. No.: 38,177

[52] U.S. Cl. ..................................... 297/372, 297/379
[51] Int. Cl. ................................................ A47c 1/026
[58] Field of Search ............... 297/366, 372, 367, 368, 379, 297/369, 377, 356, 355; 248/399

[56] References Cited

UNITED STATES PATENTS

| | | | |
|---|---|---|---|
| 3,059,890 | 10/1962 | Radke et al. | 248/399 |
| 2,567,626 | 9/1951 | Trouslot | 297/369 |
| 2,997,341 | 8/1961 | Borgia | 297/369 |
| 1,844,130 | 2/1932 | Larsen | 297/366 X |
| 784,138 | 3/1905 | Boothe | 297/372 X |
| 817,816 | 4/1906 | Stevens | 297/369 X |
| 3,455,602 | 7/1969 | Cruz | 297/367 X |
| 3,123,401 | 3/1964 | Komenda | 297/379 |

FOREIGN PATENTS OR APPLICATIONS

| | | | |
|---|---|---|---|
| 1,162,026 | 8/1969 | Great Britain | 297/367 |
| 1,063,785 | 12/1953 | France | 297/369 |
| 590,531 | 4/1959 | Italy | 297/366 |
| 480,378 | 4/1953 | Italy | 297/368 |
| 276,411 | 8/1927 | Great Britain | 297/116 |

Primary Examiner—Francis K. Zugel
Attorney—Alter, Weiss & Whitesel

[57] ABSTRACT

The back frame of a folding auto seat has a generally "L-shaped" configuration in vertical cross section. The back frame is pivotally attached to the bottom frame at a pivot point in the toe of the "L-shape." A pair of stop plates on opposite sides of the bottom frame engage a bail-like latch member which is normally spring biased to engage any latch stop on the plate. When the bail-latch is pulled against the spring bias and out of the latch stop, the back may be moved to a desired position. Then, the bail is released, and the spring bias pulls the latch into a latch stop to fix the desired position.

4 Claims, 5 Drawing Figures

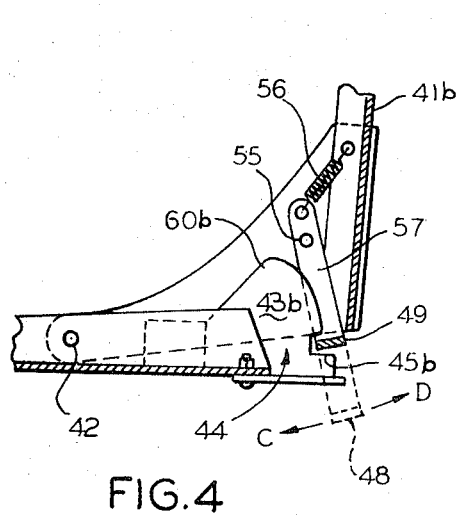
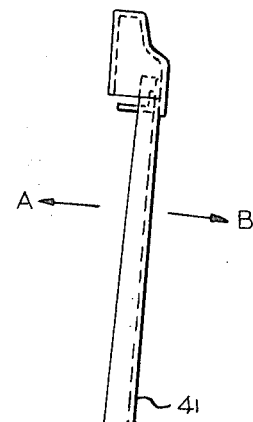
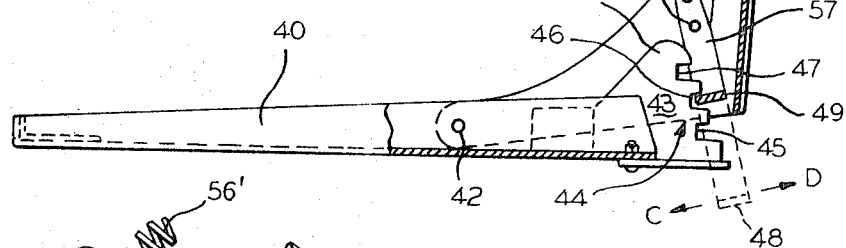
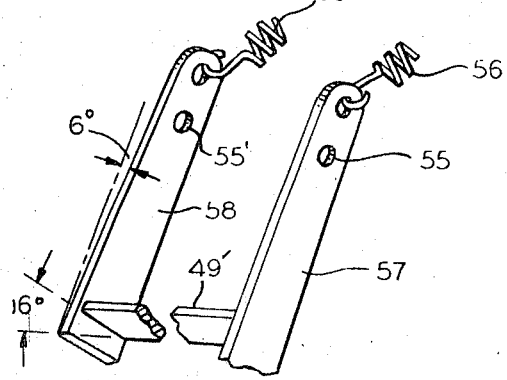
INVENTORS
PAUL FREEDMAN
GERALD FREEDMAN
ROBERT A. WAHLS
HARVEY R. HORNSTEIN
BY
Alter, Weiss and Whitesel
ATTORNEYS

COUNTERBALANCED FOLDING SEATS WITH POSITION LOCK

This invention relates to counterbalanced automobile and truck seats and more particularly to folding seats having means for selectively locking the seat back at any one of a plurality of positions.

The invention provides a safety feature for locking the back of a folding seat in a fixed position. Therefore, if the vehicle having the seat should stop suddenly, the back will not swing forward from the locked position, with possible injury to the passenger who may be occupying the seat. If there are any heavy objects behind the seat that may be hurled forward against the seat back, they will not injure the passenger since the seat back is locked into position to protect him from such flying objects.

If the seat is to be used in a truck or similar vehicle, it should be designed to give a smooth ride, free of the jolts and roughness of the roadway. This introduces a problem since the safety latch, which holds the back position, should not jiggle loose responsive to road roughness.

Accordingly, an object of the invention is to provide new and improved latches for truck and auto seat backs. Here, an object is to provide folding seats which remain fixed in position, notwithstanding the jolts and bumps of a rough road. In this connection, an object is to provide sturdy folding seats for trucks and other vehicles which might experience undue amounts of vibrations.

Another object of the invention is to provide folding seats having a number of adjustable positions which provide alternative seating postures for the occupant of the seat.

Yet another object of the invention is to provide an adjustable seat back for a fully counterbalanced and adjustable truck seat.

The nature of a preferred embodiment of the invention may be understood best from the following specification, when read in connection with the attached drawings, in which:

FIG. 2 is a side elevation view of the inventive truck seat;

FIG. 3 is an enlarged view of a fragment of FIG. 2, showing a second embodiment of the invention;

FIG. 4 is an enlarged view of a fragment of FIG. 2 showing a third embodiment of the invention; and FIG. 5 is a fragmentary view of a baillike latch mechanism used in any of the embodiments.

Figure 1:
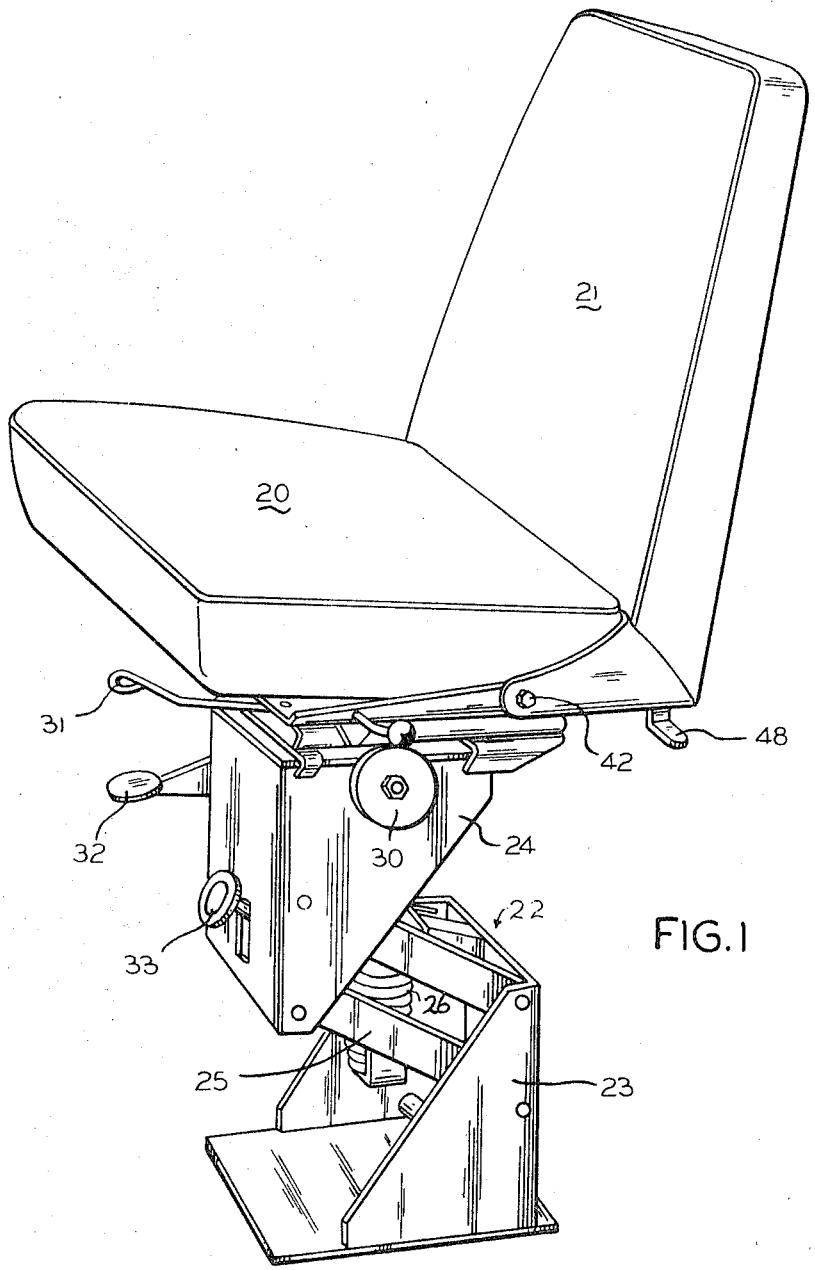
FIG. 1 is a perspective view of a counterbalanced automotive vehicle seat of the inventive type.

An exemplary, fully adjustable truck seat is seen in FIG. 1 as including a seat 20, a back 21, and an adjustable counterbalanced structure 22. This seat represents one of many similar seats which can be used in vehicles, therefore, the term "automotive vehicle" seat is used herein to cover all seats in a generic manner. The cushions in seat 20 and back 21 may be molded polyurethane supported by no-sag springs. Any suitable upholstery material, such as vinyl coated fabric or nylon, may cover the cushions.

The adjustable counterbalanced structure 22 includes a suspension assembly with slides having an attached platform 24 floating on a lever assembly 25 which is biased to an elevated position by a spring 26. A rotary handle 30 enables the seat to be tipped forward or backward to any one of several positions, the tip being such as 3°, 6° or 9° with respect to the horizontal. A lever 31 provides a latch control which enables the seat to slide forward or backward by any suitable amounts. The handle 32 provides for and controls an elevation adjustment.

The handle 33 adjusts the tension in the spring 26 to provide a firm or soft ride according to the rider's weight, preferance, and the road condition. After the spring tension is properly adjusted, the rider floats with any desired degree of firmness on a counterbalanced linkage.

The seat cushion support frame 40 (FIG. 2) is rigidly attached to the supporting mechanism 22. A somewhat "L-shaped" back cushion support frame 41 is pivotally attached to frame 40 at a pivot point 42 which is near the toe of the "L." Thus, the back may swing in the directions of the arrows A, B, to any one of many positions, thereby controlling the erectness of posture for the person sitting in the seat.

In keeping with an aspect of the invention a position indexing or latching mechanism 44 holds the seat in any of a plurality of positions. In greater detail, a stop plate 43 is rigidly attached to the bottom frame 40 near the pivot point. The stop plate 43 has a cam surface on one side and a somewhat rounded face section with a plurality of slots or latch stops 45–47 cut therein at locations which are selected to hold the seat back in any one of several posture positions which are comfortable to most persons. A handle 48 has a detent or latch 49 integral therewith for cooperating with the latch stops 45–47. The handle 48 is pivotally connected to the L-shaped structure at 55, to swing in the directions C, D.

Thus, the handle 48 may be pulled in the direction D and swung against the bias of spring 56. Then, the seat back 41 may be pivoted about the point 42 to a desired forward or backward position. The handle 48 is released, and the detent 49 falls under the urging of spring 56 into a latch stop 45–47. This latches the seat in a fixed position.

While the seat is here shown with an indexing or latch mechanism on only one side, it should be understood that a similar mechanism (FIG. 5) is also positioned on the other side of the seat. The detent 49 may be a bar 49' running across the full width of the back to engage the stop latches 45–47 on both sides, thus forming a bail assembly. The linkage plates or lever arms 57, 58 of the bail are pivoted at the points 55, 55' and toed outwardly at the side by approximately 6° , to provide a clearance over the back frame 41. The bar 49' is set at an angle of about 16° with respect to the horizontal. The single handle 48 simultaneously controls the entire bail assembly which latches on both sides.

According to the invention, the seat is not limited to use solely in a truck seat configuration, as shown in FIG. 1. For example, one seat (FIG. 2) may be adapted to assume any of many different seating postures; or it may swing forward to either a fully or a partially collapsed position. The selection among a plurality of postures enables the occupant to relax by shifting his body position while riding. The fully collapsed position facilitates entry of either a person, luggage, or cargo. On the other hand, another seat (FIG. 3) may require means for preventing a full collapse of the seat back. For example, the seat back may be limited in its travel in the forward direction. This way, the occupant of the seat is protected if a heavy object is hurled into the seat back. Still another type of seat (FIG. 4) may provide a selection between only a fully collapsed or a fully upright position. Some people may find this type of seat to be more convenient than the multiposition seat since it always latches in the preferred posture. There is no need for the occupant to hold the latch while selecting between various posture positions. A further refinement of this embodiment enables a buyer to custom select a seat having any one of many different posture positions or folding options.

The nature of a means and method of accomplishing these ends may become more apparent from a study and comparison of fIGS. 2–4. From this study, it should be apparent that the alternative embodiments are made by a selection of one from among many stop plates 43 for installation on any given seat. All other pieceparts are interchangably the same in all types of seats. This interchangability reduces costs by saving on tooling and standardizing production techniques.

In greater detail, the fully adjustable embodiment of FIG. 2 includes a latch plate 43 which has a number of latch stops 45–47 and an upper stop 60 which is relatively short and allows clearance for the detent 49, when moved in direction D. Thus, when the handle 48 moves a full distance in the direction D, the detent 49 clears the stop 60, as the seat back 41 swings forward in direction A to its fully collapsed position. As the seat back returns in the direction B, the cam surface on the back of the stop plate 43 guides the detent upward and over the top of the plate. Then, the detent 49 falls into the first latch stop 47. If the occupant does not like this position, he moves handle 48 in direction D and selects another latch stop 46, 45.

Another stop plate 43a has an elongated member 61 which projects outwardly far enough to interfer with the detent 49, even when handle 48 is swung to its maximum position in the direction D. Thus, this end limits the angle at which the back frame may collapse over the seat frame so that the seat back 41 may swing forward by only a limited amount. Here, the seat may be adjusted to any one of many posture positions, but it may not swing forward to a fully collapsed position. This way, the occupant is protected from objects which may be hurled into the rear of the seat.

Yet another embodiment is seen in FIG. 4. Here the stop plate 43b has only one posture 45b, and the upper end 60b does not stop the forward collapse of the seat back 41b. While the FIG. 4 latch stop shows the latch in a position corresponding to the latch stop position 45 in FIG. 2, the latch stop may also be provided in either of the positions, 46 or 47. Or, it might be located in any other convenient posture position. The embodiment of FIG. 4 provides a convenience since the seat either collapses fully or automatically latches in a preferred position.

Still other modifications will readily occur to those who are skilled in the art. For example, a substitution of still another stop plate configuration may allow the seat back 41 to lay back and make a bed.

An advantage of this arrangement is that any number of different seat configurations may be made from the same piece parts. The options shown here may be offered as standard features. Or, at little or no added costs, the customer's own preference needs may be satisfied. For example, a person with a deformity might buy a seat with a specially cut stop plate 43 which caused the seat to have a posture position which conforms to that particular deformity.

While the foregoing speaks only of a preferred embodiments, it should be understood that various modifications will occur to those who are skilled in the art. Therefore, the appended claims are to be construed to cover all equivalents falling within the true scope and spirit of the invention.

What we claim is:

1. A folding seat arrangement, said seat comprising a horizontal seat frame having side members for supporting a seat cushion, a back frame comprising a pair of substantially "L-shaped" spaced apart members pivotally connected at the toe of the "L's" to points on the side members, said "L-shaped" members rigidly coupled together with a horizontal member, said toes having lengths sufficient to enable to full and complete collapse of said back frame over said seat frame, stop plates rigidly attached to the rear of each of said side members, said stop plates having rearward facing horizontal latching notches therein, a pivoted plate member attached to each of said "L-shaped" members on the toes near the pivot point, a bar running across the width of the back frame and between said pivot plate members to form a baillike assembly, said bar engaging the latching notches on said stop plates to secure the back frame to the seat frame at a position determined by the notches, said stop plates having contours with camlike surfaces on the front sides thereof and rounded faces above said notches on rear sides thereof, handle means extending downward from one of said pivot plates to enable moving said pivot plate and detaching said baillike member from said latch stop to enable moving said back frame to another position while occupying said seat frame or for collapsing said seat, and resilient means for holding said pivot plate so that said baillike assembly is forced into said latching notches on said stop plates.

2. The seat of claim 1, wherein said pivot plates toe outwardly at approximately 6° to clear the seat frame.

3. The seat of claim 2, wherein said bar is longitudinally set at an angle of about 16° with respect to the horizontal.

4. The seat of claim 3 and counterbalanced support means for floatingly carrying said seat frame.

* * * * *